United States Patent
Zhang

(10) Patent No.: US 9,701,296 B2
(45) Date of Patent: Jul. 11, 2017

(54) POWER ASSIST DEVICE AND BRAKE SYSTEM

(71) Applicant: Robert Bosch GmbH, Stuttgart (DE)

(72) Inventor: Qiusheng Zhang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 14/442,214

(22) PCT Filed: Nov. 11, 2013

(86) PCT No.: PCT/CN2013/086822
§ 371 (c)(1),
(2) Date: May 12, 2015

(87) PCT Pub. No.: WO2014/071876
PCT Pub. Date: May 15, 2014

(65) Prior Publication Data
US 2016/0280196 A1 Sep. 29, 2016

(30) Foreign Application Priority Data

Nov. 12, 2012 (CN) .......................... 2012 1 0449372

(51) Int. Cl.
*B60T 13/74* (2006.01)
*B60T 13/02* (2006.01)
*F16H 25/22* (2006.01)

(52) U.S. Cl.
CPC ............ *B60T 13/745* (2013.01); *B60T 13/02* (2013.01); *F16H 25/2204* (2013.01)

(58) Field of Classification Search
CPC ..... B60T 13/745; B60T 13/02; F16H 25/2204

USPC ................... 303/114.1, 122.11, 113.4, 114.3
See application file for complete search history.

(56) References Cited

U.S. PATENT DOCUMENTS

| 4,895,227 A | 1/1990 | Grenier et al. | |
| 5,236,257 A * | 8/1993 | Monzaki | ............... B60T 8/3265 |
| | | | 303/114.1 |
| 6,634,724 B2 * | 10/2003 | Kobayashi | ............ B60T 8/3265 |
| | | | 188/1.11 E |

(Continued)

FOREIGN PATENT DOCUMENTS

| CN | 1872599 A | 12/2006 |
| CN | 102046441 A | 5/2011 |

(Continued)

OTHER PUBLICATIONS

International Search Report corresponding to PCT Application No. PCT/CN2013/086822, mailed Jan. 30, 2014 (Chinese and English language document) (6 pages).

*Primary Examiner* — Thomas Irvin
(74) *Attorney, Agent, or Firm* — Maginot, Moore & Beck LLP

(57) ABSTRACT

A booster includes a valve body and a boosting assembly with a ball screw. The ball screw includes a screw rod, a nut, and a plurality of balls cooperating with and between the screw rod and the nut. The nut is linked with the valve body and moves along a straight line on its cooperated screw rod so as to drive the valve body to move along a straight line. A brake system includes the booster and a hydraulic system that includes a braking main cylinder with a piston. The valve body is connected to the piston. The booster is configured to provide high transmission efficiency.

13 Claims, 4 Drawing Sheets

(56) References Cited

U.S. PATENT DOCUMENTS

| | | | | |
|---|---|---|---|---|
| 7,367,187 B2* | 5/2008 | Ikeda | ............... | B60T 13/746 60/545 |
| 7,823,384 B2* | 11/2010 | Ikeda | ............... | B60T 13/746 60/545 |
| 7,861,522 B2* | 1/2011 | Obata | ............... | B60T 13/745 60/545 |
| 7,980,638 B2* | 7/2011 | Matsuzaki | ............... | B60T 7/042 303/114.1 |
| 8,011,184 B2* | 9/2011 | Ohtani | ............... | B60T 13/745 60/538 |
| 8,113,595 B1 | 2/2012 | Albert et al. | | |
| 8,157,333 B2* | 4/2012 | Arakawa | ............... | B60T 1/10 303/114.1 |
| 8,348,352 B2* | 1/2013 | Nishino | ............... | B60T 7/042 303/115.2 |
| 8,387,381 B2* | 3/2013 | Ohno | ............... | B60T 13/745 60/545 |
| 8,500,213 B2* | 8/2013 | Ohtani | ............... | B60T 7/042 303/113.3 |
| 8,783,792 B2* | 7/2014 | Vollert | ............... | B60T 13/745 303/113.3 |
| 8,874,343 B2* | 10/2014 | Anderson | ............... | B60T 13/745 303/114.3 |
| 9,108,609 B2* | 8/2015 | Usui | ............... | B60T 13/745 |
| 9,108,610 B2* | 8/2015 | Philippe | ............... | B60T 13/745 |
| 9,109,463 B2* | 8/2015 | Lee | ............... | F01D 25/162 |
| 9,180,852 B2* | 11/2015 | Nomura | ............... | B60T 13/745 |
| 9,227,611 B2* | 1/2016 | Gilles | ............... | B60T 8/3275 |
| 9,291,175 B2* | 3/2016 | Ohtani | ............... | B60T 7/042 |
| 9,428,169 B2* | 8/2016 | Zhang | ............... | B60T 13/745 |
| 2010/0133051 A1 | 6/2010 | Trimpe et al. | | |
| 2012/0090316 A1* | 4/2012 | Philippe | ............... | B60T 13/745 60/545 |

FOREIGN PATENT DOCUMENTS

| | | |
|---|---|---|
| CN | 102205838 A | 10/2011 |
| CN | 102458940 A | 5/2012 |
| CN | 203005406 U | 6/2013 |
| FR | 2 860 474 A1 | 4/2005 |
| JP | 2006-29533 A | 2/2006 |
| JP | 2010-116145 A | 5/2010 |
| JP | 2012-081799 A | 4/2012 |
| JP | 2012-121486 A | 6/2012 |
| WO | 2010/149621 A1 | 12/2010 |

* cited by examiner

POWER ASSIST DEVICE AND BRAKE SYSTEM

This application is a 35 U.S.C. §371 National Stage Application of PCT/CN2013/086822, filed on Nov. 11, 2013, which claims the benefit of priority to Serial No. CN 201210449372.3, filed on Nov. 12, 2012 in China, the disclosures of which are incorporated herein by reference in their entirety.

FIELD OF THE INVENTION

The invention relates to a device for providing boosting force, and in particular, to a booster and a brake system.

BACKGROUND

Due to a limited manual power, a boosting device is often required for the operation of vehicle. For example, boosters such as compressed air, high pressure oil are used to operate associated devices in a vehicle so as to achieve the purpose of convenient use. The development of modern automotive brakes originates from primitive mechanical control devices. The most primitive braking control is only that the driver operates a set of simple mechanical devices to exert an acting force to the brake. In those days, the vehicle has a light weight and a low speed, and thus a mechanical braking can already meet the requirements of automotive braking. However, with the increase of the weight of vehicle itself, a boosting device becomes more and more important for a brake.

Chinese invention patent application No. CN102205838A which was published on Oct. 5, 2011, discloses a electric boosting braking device for vehicle, which comprises a pedal, an input force push rod connected to the pedal, a booster connected to the input force push rod, an output force push rod connected to the booster, and a main cylinder connected to the output force push rod, and the booster comprises a rack connected between the input force push rod and the output force push rod, a gear engaged with the rack, a DC motor and reducer assembly which is connected to a propeller shaft via the gear, an electronic control unit (ECU) and a speed sensor connected to the input force push rod, the speed sensor is connected to the ECU, and the ECU is connected to the DC motor and reducer assembly.

Chinese invention patent application No. CN1872599A which was published on Dec. 6, 2006, discloses a braking boosting system comprising a pedal push rod, a rubber reactive plate, a main cylinder push rod, a brake pedal and a housing, and the system further comprises a motor and a worm and gear transmission, and a rotating driving force of the motor is transformed into a linear driving force via the worm and gear transmission.

However, for either the electric boosting braking device for vehicle disclosed in Chinese invention patent application No. CN102205838A or the braking boosting system disclosed in Chinese invention patent application No. CN1872599A, such problems as poor efficiency in power transmission, loud noise in power transmission, high cost or bulky volume still exist.

Therefore, there is a need for an improved solution so as to overcome existing technical problems in the prior art.

SUMMARY OF THE INVENTION

The main technical problem to be solved by the invention is to improve the efficiency in power transmission of a booster.

In order to address the above technical problem, the invention provides a booster, comprising:
a valve body,
a boosting assembly comprising a ball screw, the ball screw comprises a screw rod, a nut and a plurality of balls cooperating with and between the screw rod and the nut, the nut is linked with the valve body, and the nut moves along a straight line on its cooperated screw rod so as to drive the valve body to move along a straight line.

Optionally, in the above booster, the boosting assembly comprises at least two ball screws and a transmission device, and the transmission device comprises an input rotating shaft which is linked with the screw rod and transmits a rotational power of the input rotating shaft to each screw rod.

Optionally, in the above booster, the boosting assembly further comprises a boosting plate, to which the nut is installed in a non-rotatable way relative thereto, and the boosting assembly drives the valve body through the boosting plate.

Optionally, in the above booster, the booster further comprises a housing, and the valve body can move along a longitudinal straight line between a first position and a second position relative to the housing, when the input rotating shaft rotates in a forward direction, the nut moves along a straight line on its cooperated screw rod in a forward stroke so that the boosting assembly drives the valve body to move along a straight line towards the first position, and when input rotating shaft rotates in a reverse direction, the nut moves along a straight line on its cooperated screw rod in a backward stroke so that the boosting assembly drives the valve body to move along a straight line towards the second position.

Optionally, in the above booster, the booster further comprises an input component, an actuator, an electronic control unit and a stroke sensor, the input component can drive the valve body to move along a straight line towards the first position without the boost from the boosting assembly, the actuator can output a rotational power to the input rotating shaft, the stroke sensor detects a displacement of the input component, and the electronic control unit controls the operation of the actuator according to the displacement of the input component detected by the stroke sensor.

Optionally, in the above booster, the boosting plate is provided with a central hole, through which the valve body passes, the valve body is provided with a boosting boss, and the nut abuts against the boosting boss via the boosting plate and then drives the valve body.

Optionally, in the above booster, the booster further comprises a first resilient component, when the valve moves towards the first position, the first resilient component is elastically deformed so as to store a potential energy, and when the first resilient component releases the potential energy, the first resilient component drives the valve body to move towards the second position.

Optionally, in the above booster, the input component can reciprocate between a rest position and a drive position relative to the valve body, and a second resilient component is disposed between the input component and the valve body, and the input component is held at the rest position by the resilient force of the second resilient component without an external force being applied, and when an external force drives the input component to move towards the drive position, the second resilient component is elastically deformed so as to store a potential energy, and when the input component arrives at the drive position, the input component, under a further action of the external force, drives the valve body to move, and when the second resilient component releases the potential energy, the second resilient component drives the input component to move towards the rest position.

Optionally, in the above booster, the booster further comprises an actuator connected to the input rotating shaft, the actuator is a motor that can output a rotational power in a forward direction and in a reverse direction, and the screw rods of the at least two ball screws are disposed in an axial symmetrical manner relative to the valve body.

Optionally, in the above booster, the transmission device is a gear transmission device which has a plastic gear mounted to a steel shaft.

Optionally, in the above booster, the stroke sensor is a magnetic medium sensor.

Optionally, in the above booster, a connection structure is disposed between the valve body and the nut, a part of the connection structure is fixed to the nut, and another part is connected to the valve body.

In order to address the above technical problem, the invention further provides a brake system comprising the above described booster and a hydraulic system, the hydraulic system comprises a main braking cylinder having a piston, and the valve body is connected to the piston.

Optionally, in the above brake system, a reactive plate made of a resilient material is installed between the valve body and the piston.

As compared to an existing boosting device, the booster according to the invention has high transmission efficiency. Moreover, the structure is reasonably designed with a small volume and a low cost.

Other aspects and features of the invention will become apparent from the following detailed description made with reference to the accompanying drawings. However, it should be understood that the accompanying drawings are designed for the purpose of illustration only, and is not intended for limiting the scope of the invention since the scope of protection should be defined with reference to the appended claims. It is also understood that the accompanying drawings merely intends to illustrate the structures and flowcharts described herein in a schematic way and are not necessarily drawn to scale unless otherwise specified.

BRIEF DESCRIPTION OF THE DRAWINGS

The invention will be more fully understood in connection with detailed description of specific embodiments made with reference to the accompanying drawings, in which identical elements are denoted by identical reference signs throughout the drawings, wherein.

DETAILED DESCRIPTION OF THE INVENTION

Figure 1:
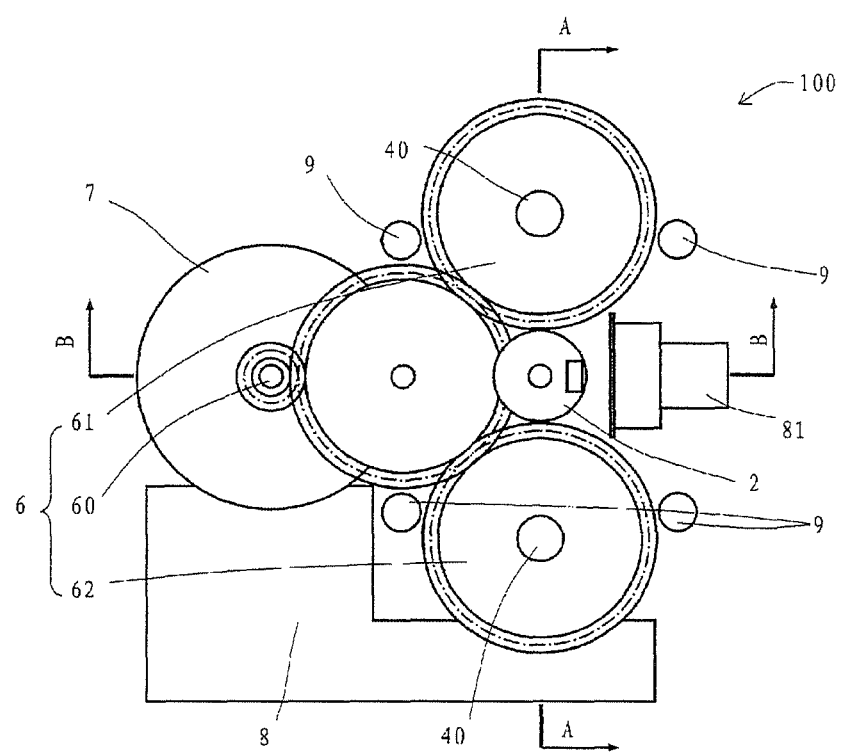
FIG. 1 shows a schematic view of a booster according to a specific embodiment of the invention, in which a housing of the booster is not shown for facilitating illustration of an inner structure of the booster.

The specific embodiments of the invention will be described below in detail with reference to the accompanying drawings in order that those skilled in the art can precisely understand the subject matter claimed in the invention.

The invention provides a braking system which comprises a booster 100 and a hydraulic system as shown in FIGS. 1-7, and the hydraulic system comprises a main braking cylinder 11 having a piston 12. Specific embodiments of the booster 100 provided by the invention will be described below in details.

With reference to FIGS. 1-7, the booster 100 according to a specific embodiment of the invention is fixed by fixing bolts 9. The booster 100 comprises a valve body 2 and a boosting assembly. The valve body 2 is connected to the piston 12 of the main braking cylinder 11, the boosting assembly comprises a ball screw and an input rotating shaft 60, the ball screw comprises a screw rod 40, a nut 41 and a plurality of balls (not shown) cooperated with and between the screw rod 40 and the nut 41, and the screw rod 40 is linked with the input rotating shaft 60 so that when the input rotating shaft 60 rotates, the screw rod 40 is driven to rotate by a power transmitted from the input rotating shaft 60 and the nut 41 moves along a straight line on its cooperated screw rod 40 so that the boosting assembly drives the valve body 2 to move along a straight line. The booster 100 of the invention has high transmission efficiency.

The booster 100 further comprises a housing 1, and the valve body 2 can move along a longitudinal straight line between a first position and a second position relative to the housing 1; when the input rotating shaft 60 rotates in a forward direction, the nut 41 moves along a straight line on its cooperated screw rod 40 in a forward stroke so that the boosting assembly drives the valve body 2 to move along a straight line towards the first position, and when input rotating shaft 60 rotates in a reverse direction, the nut 41 moves along a straight line on its cooperated screw rod 40 in a backward stroke so that the boosting assembly drives the valve body 2 to move along a straight line towards the second position. The housing 1 is provided with a receiving space 10. The valve body 2 comprises a first end 21 and a second end 22 opposite to the first end 21, and the first end 21 is received in the receiving space 10 and the second end 22 projects out of the receiving space 10. Optionally, the housing 1 is installed with a valve body guide bearing 19 in which the valve body 2 is installed so that the valve body 2 can move longitudinally under the guidance of the valve body guide bearing 19. The housing 1 is further installed with a shield 13 which has a substantial horn shape and a bellow structure that can be telescopically deformed. The larger opening of the shield 13 is engaged to the housing 1. The second end 22 of the valve body 2 that projects out of the receiving space 10 extends to the inside of the shield 13 from a bottom end of the shield 13.

Figure 3:
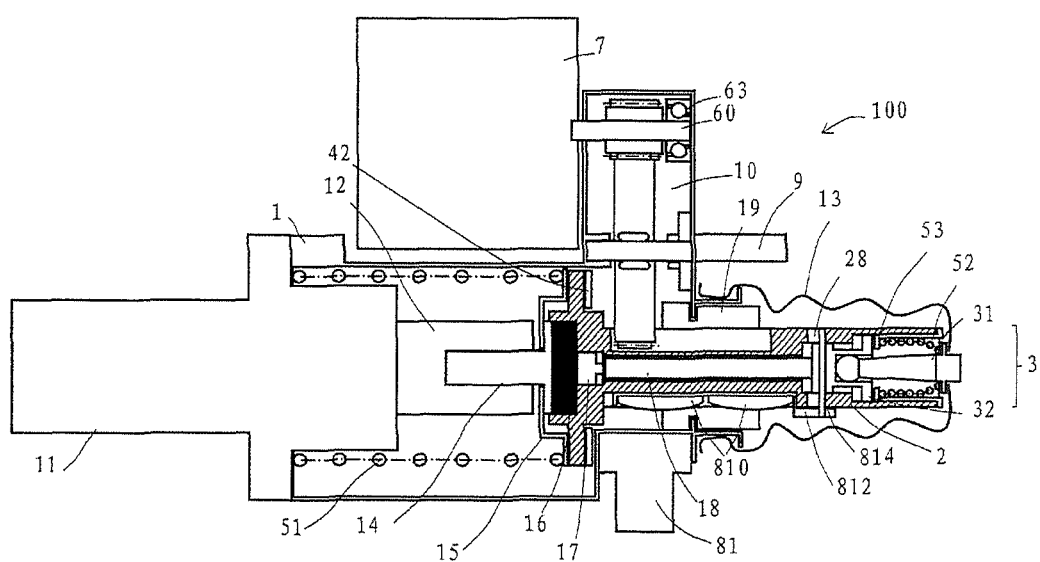
FIG. 3 shows a schematic sectional view of the structure of the booster taken along a line B-B shown in FIG. 1, wherein the booster is in a rest state.
Figure 4:
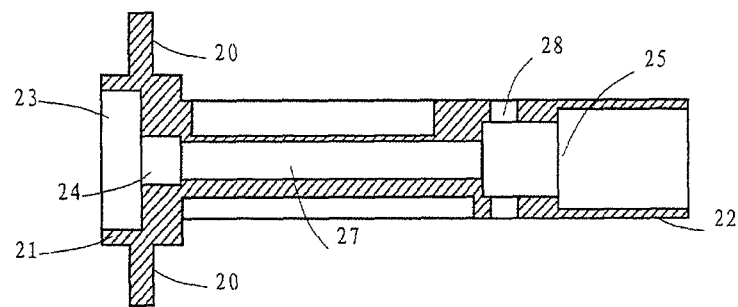
FIG. 4 shows a schematic structure view of a valve body according to a specific embodiment of the invention in a partially enlarged manner from a perspective similar to that of FIG. 3.
Figure 5:
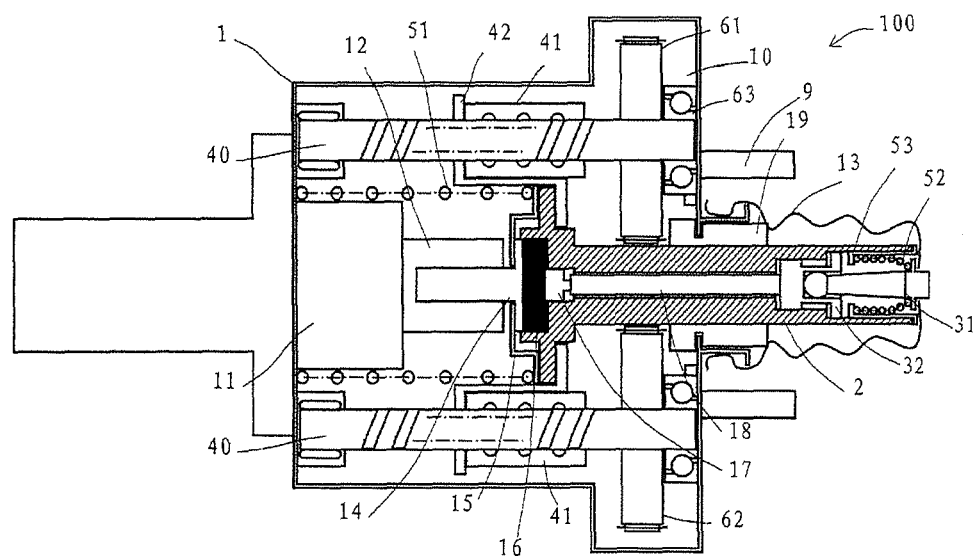
FIG. 5 shows a schematic structure view of the booster shown in FIG. 2 in a state where a pedal force is applied and the booster has turned on the boosting function.

With particular reference to FIGS. 3 and 4, the first end 21 of the valve body 2 is provided with a first counterbore 23, and a second counterbore 24 is provided at a central position of the bottom portion of the first counterbore 23. The diameter of the second counterbore 24 is smaller than that of the first counterbore 23 so that a step is formed between the first counterbore 23 and the second counterbore 24. An end portion of the second end 22 of the valve body 2 is provided with an inlet counterbore 25. A mandril hole 27 is provided at a central portion of the valve body 2, which communicates the second counterbore 24 with the inlet counterbore 25.

In this specific embodiment, an example will be described in which the boosting assembly comprises at least two ball screws. Two screw rods 40 of the two ball screws are installed inside the receiving space 10 of the housing 1 in parallel. When each screw rod 4 rotates in a forward direction, the nut 41 moves along a straight line on its cooperated screw rod 4 in a forward stroke so that the boosting assembly drives the valve body 2 to move along a straight line towards the first position during the forward stroke of the nut 41; and when each screw rod 4 rotates in a reverse direction, the nut 41 moves along a straight line on its cooperated screw rod 4 in a backward stroke. Optionally, the boosting assembly comprises a transmission device 6 which comprises an input rotating shaft 60 and transmits a rotational power of the input rotating shaft 60 to each screw rod 40. Specifically, the transmission device 6 further comprises at least two output wheels 61, 62, and several intermediate gears (not given reference signs) can be also comprised as required for transmission. The transmission device 6 transforms the rotational power of the input rotating shaft 60 into rotational power of the two output wheels 61, 62 through speed changing. Each of the output wheels 61, 62 is connected to a screw rod 40 in a non-rotatable way relative to each other so that the rotational power of the input rotating shaft 60 is transmitted to each screw rod 40. In an optional specific embodiment, the input rotating shaft 60 is a gear transmission device which has a plastic gear mounted to a steel shaft. While the transmission device 6 is described as a gear transmission mechanism in a specific embodiment of the invention, those skilled in the art will understand that the invention is not limited to such a configuration. For example, the transmission device 6 can be also a sprocket transmission device, a pulley transmission device and a combination of various transmissions. As will be described in detail later, the nut 41 does not rotate, but is pushed by the rotating screw rod 40. The nut 41 transmits a boosting force to the valve body 2 via a boosting plate 42. When the pedal force disappears, due to the movement of a plunger 32, the stroke sensor 81 will inform the electronic unit 8 to control the motor which serves as an actuator 7 to rotate in a reverse direction. Meanwhile, as will be described in detail below, a first resilient component 51 will push the valve body 2 back. While the booster 100 according to this specific embodiment comprises two ball screws, those skilled in the art will understand that the booster 100 of the invention is not limited to comprising two ball screws; three or more ball screws can be also comprised, which will also fall within the scope of the protection of the invention. Each ball screw comprises a screw rod 40, a nut 41 and a plurality of balls cooperating with and between the screw rod 40 and the nut 41. Moreover, optionally, the screw rod 40 of the at least two ball screws are disposed in an axial symmetrical manner relative to the valve body 2, thus enabling the boosting assembly to apply a force to the valve body 2 in a uniform manner.

The boosting assembly further comprises a boosting plate 42 which can move longitudinally relative to the valve body 2, but is not rotatable relative to the valve body 2. Each of the two nuts 41 is installed to the boosting plate 42 in a non-rotatable way relative thereto, and the boosting assembly drives the valve body 2 via the boosting plate 42. The boosting plate 42 is provided with a central hole, through which the valve body 2 passes, the valve body 2 is provided with a boosting boss 20 which is disposed adjacent to the first end 21 of the valve body 2. During the forward stoke of the nut 41, the boosting plate 42 abuts against the boosting boss 20 and then drives the valve body 2.

The booster 100 further comprises a first resilient component 51. In a specific embodiment, the first resilient component 51 is a coil spring which is installed between the housing 1 and a push rod retainer 15 fixed to the valve body 2, and is pre-compressed. Of course, those skilled in the art will understand that the first resilient component 51 can be also made from other materials, and the first resilient component 51 can be also installed in other ways. For example, the first resilient component 51 can be a laminated spring; the way of installing the first resilient component 51 can be changed into installing it directly between the main braking cylinder 11 fixed to the housing 1 and the valve body 2. As compared to the previous way of installation, the latter way of installation merely requires the housing 1 to get out of the way (e.g., to drill a hole at the location occupied by the first resilient component 51 on the housing 1), so that the first resilient component 51 can contact the main braking cylinder 11; if only the push rod retainer 15 gets out of the way (e.g., by narrowing the push rod retainer 15), the first resilient component 51 can contact the valve body 2. Also, for example, the previous ways of installation all involve deformation by pre-compression. Those skilled in the art will understand that first resilient component 51 can be also stretched to be deformed. Various changes and modification to the first resilient component 51 are within the scope of the invention, as long as a resilient force of the first resilient component 51 can act upon the valve body 2 directly or indirectly. Therefore, when the valve body 2 moves towards the first position, the first resilient component 51 is elastically deformed to store a potential energy, and when the first resilient component 51 releases the potential energy, the first resilient component 51 drives the valve body 2 to move towards the second position.

The booster 100 further comprises an input component 3, an actuator 7, an electronic control unit 8 and a stroke sensor 81. The input component 3 can drive the valve body 2 to move along a straight line towards the first position without the boost from the boosting assembly, the actuator 7 is connected to the input rotating shaft 60 so that it can output a rotational power to the input rotating shaft 60, the stroke sensor 81 detects a displacement of the input component 3, and the electronic control unit 8 controls the operation of the actuator 7 according to the displacement of the input component 3 detected by the stroke sensor 81.

The input component 3 can reciprocate between a rest position and a drive position relative to the valve body 2. The input component 3 comprises a pedal (not shown) that receives an operational request from the driver, an input rod 31 connected to the pedal and a plunger 32 connected to the input rod 31. The input component 3 is at least partially installed in the inlet counterbore 25, wherein the plunger 32 is installed in the inlet counterbore 25, and at least a part of the input rod 31 is also installed in the inlet counterbore 25. A resilient component retainer 53 is installed in an opening at a longitudinal end of the inlet counterbore 25, a part of the input rod 31 passes through a through-hole at a middle portion of the resilient component retainer 53 and a through-hole at a top end of the shield 13 so as to be connected to the pedal.

In a specific embodiment of the invention, the actuator 7 is a motor that can output a rotational power in a forward direction and in a reverse direction. Those skilled in the art will understand that the operational direction of the motor can be switched so as to output a rotational power in a forward direction or in a reverse direction, which is more easily realized than a mechanical change-over. Moreover, since a mechanical change-over device typically requires an occupation of a certain volume, the use of a motor that can output a rotational power in a forward direction and in a reverse direction as the actuator 7 can also contribute to a reduction of overall volume of the booster 100.

In a specific embodiment of the invention, the stroke sensor 81 is a magnetic medium sensor. A guide groove 28 is disposed radially through the valve body 2 and has a longitudinally extending elongated groove shape. A key 814 fixed to the plunger 32 extends out radially from two sides of the plunger 32. The extended key 814 can reciprocate longitudinally in the guide grooves 28 at two opposite sides. The valve body 2 is installed externally with a magnet retainer 812, in which magnets are installed. In the specific embodiment shown in FIG. 3, two magnets 810 are installed in the magnet retainer 812. The magnet retainer 812 is movably installed in a groove (not given a reference sign) outside of the valve body 2 and can reciprocate longitudinally under the guidance of the groove. An end of the key 814 passes through the guide groove 28 on one side so as to be fixed to the magnet retainer 812. Therefore, the magnet retainer 812 can move with the movement of the plunger 32. The stroke sensor 81 is installed at an outside of the magnet 810. When the magnet retainer 812 and the two magnets 810 installed therein move with the plunger 32, the stroke sensor 81 will sense a variation of the magnetic field so that the stroke is detected. It is noted that in the specific embodiment shown in FIG. 3, the magnet retainer 812 and the two magnets 810 installed therein are located inside of the housing 1. That is, the magnet retainer 812 and the two magnets 810 installed therein are located between the housing 1 and the valve body 2, whereas the stroke 81 is disposed at an outside of the housing 1.

Figure 7:
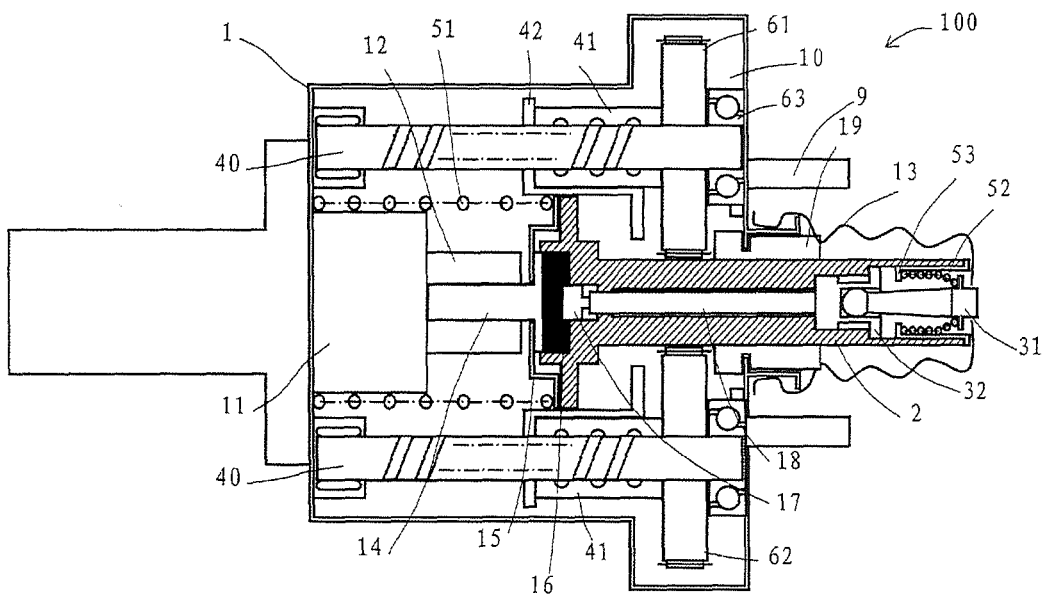
FIG. 7 shows a schematic structure view of the booster shown in FIG. 2 in a state where the boosting function is disabled and a pedal force is applied to enable braking.

The input component 3 can reciprocate between a rest position and a drive position relative to the valve body 2. When the input component 3 reciprocates between a rest position and a drive position relative to the valve body 2, the plunger 32 reciprocates longitudinally in the inlet counterbore 25 accordingly. A second resilient component 52 is disposed between the input component 3 and the valve body 2. Specifically, the second resilient component 52 is disposed in the inlet counterbore 25 of the valve body 2. Optionally, one end of the second resilient component 52 is installed on the resilient component retainer 53 in the inlet counterbore 25, and the other end is installed to the input rod 31 of the input component 3, and the second resilient component 52 has a certain amount of pre-compression. If the driver does not depress the brake pedal, no external force is applied to the input component 3; in case of no external force applied, the input component 3 is held at the rest position by the resilient force of the second resilient component 52. When the input component 3 is in the rest position, as shown in FIG. 3, the key 814 fixed to the plunger 32 rests on an end of the guide groove 28 that is close to the second end due to the resilience of the second resilient component 52. When the external force transmitted from the pedal drives the input component 3 to move towards the drive position, the second resilient component 52 is compressed to be elastically deformed so that a potential energy is stored. When the input component 3 arrives at the drive position, as shown in FIG. 7, the plunger 32 abuts against the valve body 2. If the pedal continues to transmit the external force, under a further action of the external force, the input component 3 longitudinally drives the valve body 2 to move along a straight line towards the first position. If the driver releases the pedal, the pedal no longer transmits the external force, and the compressed second resilient component 52 which has stored a resilient potential energy will stretch towards a return direction so as to release the potential energy. When the second resilient component 52 releases the potential energy, the second resilient component 52 drives the input component 3 to move towards the rest position.

Figure 2:
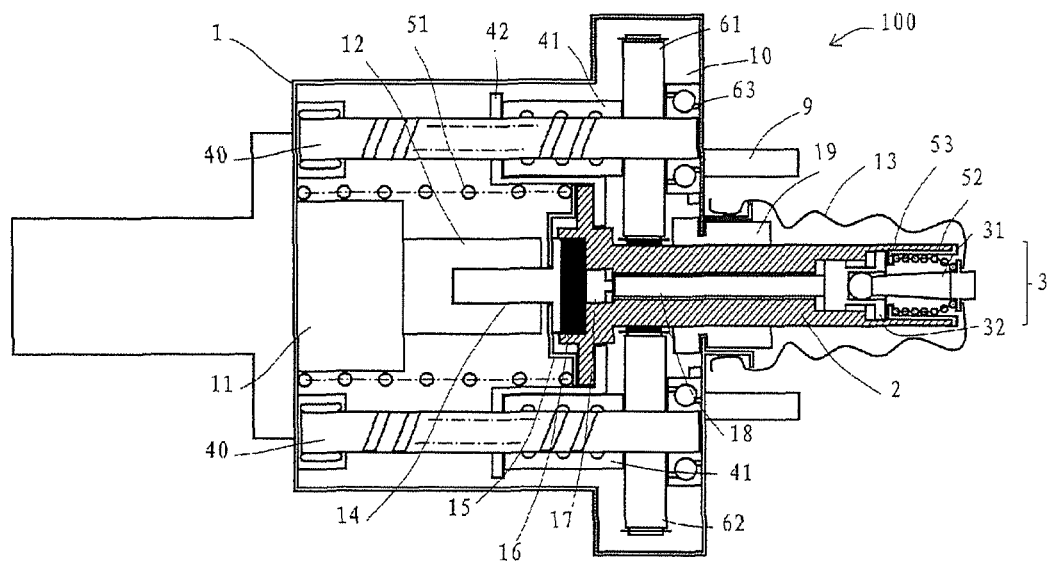
FIG. 2 shows a schematic sectional view of the structure of the booster taken along a line A-A shown in FIG. 1, wherein the booster is in a rest state.

In the brake system of the invention, the main barking cylinder 11 has a piston 12 connected to the push rod 14 of the booster 100, and the push rod 14 is fixed to the first end 21 of the valve body 2 by the push rod retainer 15. With particular reference to FIGS. 2-4, optionally, a reacting plate 16 made from a resilient material is installed between the valve body 2 and the piston 12. Specifically, the reacting plate 16 is installed at a bottom portion of the first counterbore 23 of the valve body 2, whereas the end portion of the push rod 14 has an enlarged portion which is installed at an outside of the reacting plate 16 installed in the first counterbore 23. The push rod retainer 15 is provided with a through-hole at the middle portion, through which the push rod 14 passes so as to be connected to the piston 12, but the enlarged portion at the end portion of the push rod 14 is fixed in the first counterbore 23 by the push rod retainer 15. A plunger plate 17 is installed in the second counterbore 24 of the valve body 2. Since the second counterbore 24 communicates with the mandril hole 27 and communicates with the first counterbore 23 through a middle portion of the bottom portion of the first counterbore 23, the mandril 18 which is movable in the mandril hole 27 can contact the plunger plate 17, and the plunger plate 17 can contact the reacting plate 16 installed at a bottom portion of the first counterbore 23.

Those skilled in the art will understand that in the technical solution of the invention, the transmission device 6 is used for a transmission from a rotational movement to another rotational movement. A well developed gear transmission device can be used, which can be easily manufactured and has high transmission efficiency. The rotational movement is finally transformed into a linear movement by the ball screw. The ball screw can provide a large amplification ratio of power. Therefore, a small torque is required to be input, and the gear exerts a small lateral force to the bearing 63, which is advantageous for lower requirements on the specification of the bearing 63. Since balls are cooperated with and between the screw rod 40 of the ball screw and the nut 41, a rolling friction is generated between components during operation, and the transmission loss of the ball screw is small. In addition, the ball screw is a mature technology that has developed for many years, and there is already a precise manufacturing flowchart thereof in the industry. As compared to a conventional threading engagement, the ball screw has a small backlash and a high positioning accuracy. Therefore, the ball screw can provide a transformation from a rotational movement to a linear movement with high efficiency and high positioning accuracy. Thus, as a whole, the technical solution of the invention has high transmission efficiency, small transmission torque and high positioning accuracy, and can be easily manufactured, thus ensuring a good quality. Consequently, as compared to a situation where the same boosting force is provided, the technical solution of the invention can use components (e.g., the actuator 7) with smaller specification than a conventional technical solution, thus lowering cost and reducing the volume of the booster 100. Moreover, the gear can be a plastic gear so that the cost is lowered and the weight is reduced, and the inertia of rotating transmission components is reduced. For example, the transmission device may have a plastic gear installed to a steel shaft, thus presenting an excellent overall performance.

In particular use, the booster 100 can operate in two modes, i.e., a boosting drive mode and a manual drive mode.

Figure 6:
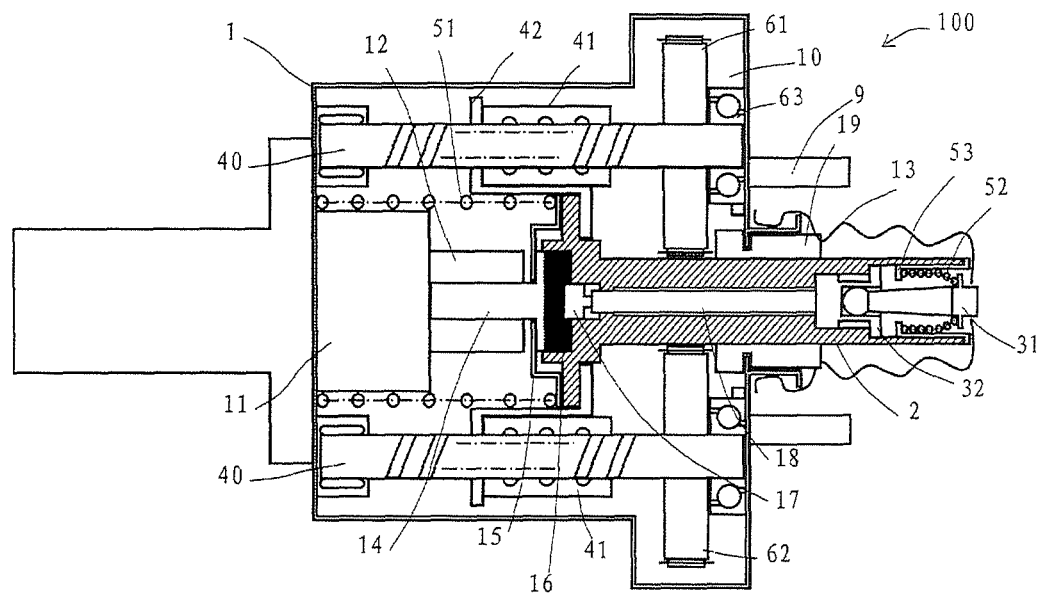
FIG. 6 shows a schematic structure view of the booster shown in FIG. 2 in a state where a pedal force is applied and the booster has turned on the boosting function.

For example, in case that such control elements as the actuator 7 and the electronic control unit 8 all work properly, when the driver depresses the brake pedal, the input rod 31 transmits an external force to the plunger 32 which, in turn, pushes the mandril 18. Meanwhile, the key 814 drives the magnet retainer 812. When the magnet retainer 812 and the two magnets 810 installed therein move, the stroke sensor 81 will sense a variation of the magnetic field so that the stroke is detected. The electronic control unit 8 collects the signal detected by the stroke sensor 81 and determines a braking requirement, thus instructing the motor which serves as the actuator 7 to rotate in a forward direction and output a rotational power in the forward direction. The power is input via the input rotating shaft 60 to the gear transmission device which serves as the transmission device 6, and the rotational power is transmitted to the two output wheels 61, 62 through gear transmission; the two output wheels 61, 62 are synchronous in rotation, and therefore drive synchronously the screw rods 40 that are respectively connected to the two output wheels 61, 62 non-rotatably relative to each other; since the nut 41 is non-rotatable, the screw rod 40 rotates relative to the nut 41, thus driving the nut 41 to move longitudinally along a straight line in a forward stroke; the nut 41 drives the boosting plate 42 which, in turn, applies a pushing force on the boosting boss 20 so that the valve body 2 is driven to move along a straight line towards the first position. The bottom portion of the second counterbore 24 on the first end 21 of the valve body 2 applies a pushing force to an annular area at a periphery of the reacting plate 16 so that the reacting plate 16 transmits the pushing force to the push rod 14 installed at an outside of the reacting plate 16. Therefore, the push rod 14 and the piston 12 connected to the push rod 14 are pushed and move together. Meanwhile, the spring which serves as the first resilient component 51 is compressed and deformed so as to store resilient potential energy. FIG. 6 shows a schematic view of the booster 100 according to the boosting drive mode, and FIG. 6 shows a schematic view of the booster 100 reaching a maximum boosting force according to boosting drive mode. It is additionally noted that, when the mandril 18 moves forward when pushed by the plunger 32, the mandril 18 pushes the plunger plate 17. There is typically a gap between the reacting plate 16 and the plunger plate 17. After the mandril 18 pushes the plunger plate 17 so that the gap between the reacting plate 16 and the plunger plate 17 is eliminated, the plunger plate 17 presses a middle portion area of the reacting plate 16. The reacting plate 16 is generally made from a resilient material such as rubber or the like. Like liquid, the reacting plate 16 made from such a material when under pressure will have an effect of transmitting pressure. When the boosting force becomes larger and larger, the annular area at the periphery of the reacting plate 16 will be subject to larger and larger pressure, and the pressure will at the same time be transmitted to the middle portion area of the reacting plate 16 so that the driver can feel an increasing pressure, thus obtaining a well depression feedback. Therefore, the booster 100 can provide an excellent driving experience. The pushing force of the pedal is transmitted to the reacting plate 16 via the mandril 18 and the plunger plate 17. The boosting force of the actuator 7 is also applied to the reacting plate 16 via the valve body 2. A resultant force of the two forces is applied to the output push rod 14 via reacting plate 16. When the driver releases the brake pedal, which means that braking is no longer required, the second resilient component 52 releases the resilient potential energy to push the input rod 31. The input rod 32, under a resilient action of the second resilient component 52, will return to the rest position. Meanwhile, the plunger 32 will also return to the rest position. At the same time, the key 814 drives the magnet retainer 812 to move, and the stroke sensor 81 will sense a variation of the magnetic field, thus detecting variation in stroke. The control unit 8 collects the signal detected by the stroke sensor 81 and determines the braking requirement is cancelled, thus instructing the motor which serves as the actuator 7 to rotate in a reverse direction and output a rotational power in the reverse direction, further driving the boosting assembly to move backward. Meanwhile, the first resilient component 51 releases the resilient potential energy to push the valve body 2 which, under a resilient action of the first resilient component 51, will return to the second position. Optionally, a rotational angle sensor (not shown) is provided inside the actuator 7. In a boosting state, the date detected by the rotational angle sensor is converted according to a transmission ratio of the transmission device 6 so as to obtain the position of the valve body 2. When the pedal pushes the plunger 32, the electronic control unit 8 can control a relative position between the valve body 2 and the plunger 32. During operation of the booster 100 in a normal boosting state, since the relative position between the valve body 2 and the plunger 32 is always held, there is no longitudinal mutual acting force between the valve body 2 and the plunger 32.

Further, for example, in case that such control elements as the actuator 7 and the electronic control unit 8 and such components as the transmission device 6 cannot work properly due to misfunction, when the driver depresses the brake pedal, the input rod 31 transmits an external force to the plunger 32, and the meanwhile, the second resilient component 52 is compressed to store a potential energy. The plunger 32 further pushes the mandril 18. At the same time, the plunger 32 drives the magnet retainer 812 to move via the key 814. However, since the actuator 7 cannot provide a boosting force due to failure at this moment, the screw rod 40 cannot rotate. Since the screw rod 40 cannot rotate, the nut 41 and the boosting plate 42 remain stationary. As shown in FIG. 7, the plunger 32 abuts against the valve body 2 until the input component 3 arrives at the drive position. If the pedal continues to transmit the external force, the input component 3 under a further action of the external force will drive the valve body 2 to move along a straight line towards the first position; therefore, the valve body 2 pushes the push rod 14 and the piston 12 connected to the push rod 14 are pushed and move together. Meanwhile, the spring which serves as the first resilient component 51 is compressed and deformed so as to store resilient potential energy. If the driver releases the brake pedal and the pedal no longer transmits the external force, the compressed first resilient component 51 which has stored resilient potential energy will release the resilient potential energy and push the valve body 2 which, under a resilient action of the first resilient component 51, will return to the second position; finally, the compressed second resilient component 52 which has stored resilient potential energy will also be stretched to release the potential energy, and when the second resilient component 52 release the potential energy, the second resilient component 52 will drive the input component 3 to move towards the rest position.

Those skilled in the art will understand that the realization of link between the nut 41 and the valve body 2 is not limited to the boosting plate 42. There are various other ways to realize the link between the nut 41 and the valve body 2. For example, a connection mechanism (not shown) can be provided between the valve body 2 and the nut 41. A part of the connecting mechanism is fixed to the nut 41, and another part if connected to the valve body 2. Specifically and by way of example, the connection mechanism can be a rail mechanism connected between the nut 41 and the valve body 2. The rail mechanism restricts a relative rotation between the nut 41 and the valve body 2, but allows the nut 41 and the valve body 2 to slide axially relative to each other within a certain stroke.

As compared to existing boosting device, the booster 100 according to the invention has high transmission efficiency. Moreover, the structure is designed reasonably, the volume is small, and the cost is low.

The above described specific embodiments are merely for the purpose of illustrating the invention, rather than limiting the invention in any way. Those skilled in relevant technical fields can also make various modifications and variations to the invention without departing from the scope of the invention. For example, the plunger 32 and the mandril 18 can be manufactured as a single part as a whole. Other displacement sensors (e.g., an angular displacement sensor mounted to the pedal, etc.) can be also used to obtain the displacement of the input component 3. Therefore, all equivalent technical solutions are all within the scope of the invention, which should be defined by the appended claims.

The invention claimed is:

1. A booster, comprising:
    a valve body; and
    a boosting assembly comprising a nut and at least two ball screws, each of the at least two ball screws including a respective screw rod and a plurality of balls cooperating with and between the respective screw rod and the nut, wherein
        the nut is linked with the valve body and moves along a straight line on the respective screw rods so as to drive the valve body to move along a straight line,
        the boosting assembly further comprises a transmission device, and
        the transmission device comprises an input rotating shaft that is linked with the respective screw rods and transmits a rotational power of the input rotating shaft to each respective screw rod.

2. The booster according to claim 1, wherein the boosting assembly further comprises a boosting plate to which the nut is installed in a non-rotatable manner relative thereto, and wherein the boosting assembly drives the valve body through the boosting plate.

3. The booster according to claim 2, wherein the boosting plate defines a central hole through which the valve body passes, wherein the valve body has a boosting boss, and wherein the nut abuts against the boosting boss via the boosting plate and then drives the valve body.

4. The booster according to claim 1, further comprising a housing, wherein:
    the valve body is configured to move along a longitudinal straight line between a first position and a second position relative to the housing,
    when the input rotating shaft rotates in a forward direction, the nut moves along a straight line on the respective screw rods in a forward stroke so that the boosting assembly drives the valve body to move along a straight line towards the first position, and
    when input rotating shaft rotates in a reverse direction, the nut moves along a straight line on the respective screw rods in a backward stroke so that the boosting assembly drives the valve body to move along a straight line towards the second position.

5. The booster according to claim 4, further comprising a first resilient component, wherein:
    when the valve body moves towards the first position, the first resilient component is elastically deformed so as to store a potential energy; and
    when the first resilient component releases the potential energy, the first resilient component drives the valve body to move towards the second position.

6. The booster according to claim 1, further comprising a housing, an input component, an actuator, an electronic control unit, and a stroke sensor, wherein:
    the valve body is configured to move along a longitudinal straight line between a first position and a second position relative to the housing,
    the input component is configured to drive the valve body to move along a straight line towards the first position without the boost from the boosting assembly,
    the actuator is configured to output a rotational power to the input rotating shaft,
    the stroke sensor detects a displacement of the input component, and
    the electronic control unit controls the operation of the actuator according to the displacement of the input component detected by the stroke sensor.

7. The booster according to claim 6, wherein:
    the input component is configured to reciprocate between a rest position and a drive position relative to the valve body;
    a second resilient component is disposed between the input component and the valve body;
    the input component is held at the rest position by the resilient force of the second resilient component without an external force being applied;
    when an external force drives the input component to move towards the drive position, the second resilient component is elastically deformed so as to store a potential energy;
    when the input component arrives at the drive position, the input component, under a further action of the external force, drives the valve body to move; and
    when the second resilient component releases the potential energy, the second resilient component drives the input component to move towards the rest position.

8. The booster according to claim 6, wherein the stroke sensor is a magnetic medium sensor.

9. The booster according to claim 1, further comprising an actuator connected to the input rotating shaft, wherein the actuator is a motor that is configured output a rotational power in a forward direction and in a reverse direction, and wherein the respective screw rods of the at least two ball screws are disposed in an axial symmetrical manner relative to the valve body.

10. The booster according to claim 1, wherein the transmission device is a gear transmission device that has a plastic gear mounted to a steel shaft.

11. The booster according to claim 1, wherein a connection structure is disposed between the valve body and the nut, and wherein a part of the connection structure is fixed to the nut and another part of the connection structure is connected to the valve body.

12. A brake system, comprising:
a hydraulic system including a main braking cylinder having a piston; and
a booster including:
a valve body; and
a boosting assembly comprising a nut and at least two ball screws, each of the at least two ball screws including a respective screw rod and a plurality of balls cooperating with and between the screw rod and the nut, wherein
the nut is linked with the valve body and moves along a straight line on the respective screw rods so as to drive the valve body to move along a straight line,
the valve body is connected to the piston,
the boosting assembly further comprises a transmission device, and
the transmission device comprises an input rotating shaft that is linked with the respective screw rods and transmits a rotational power of the input rotating shaft to each respective screw rod.

13. The brake system according to claim 12, wherein a reacting plate including a resilient material is arranged between the valve body and the piston.

* * * * *